US012752720B2

(12) United States Patent
Takayasu et al.

(10) Patent No.: US 12,752,720 B2
(45) Date of Patent: Oct. 6, 2026

(54) SOUND ABSORBING MATERIAL, AND VEHICLE MEMBER

(71) Applicant: Resonac Corporation, Tokyo (JP)

(72) Inventors: Satoshi Takayasu, Tokyo (JP); Mari Shimizu, Tokyo (JP); Tomohiko Kotake, Tokyo (JP)

(73) Assignee: Resonac Corporation, Tokyo (JP)

( * ) Notice: Subject to any disclaimer, the term of this patent is extended or adjusted under 35 U.S.C. 154(b) by 314 days.

(21) Appl. No.: 18/555,178

(22) PCT Filed: Apr. 16, 2021

(86) PCT No.: PCT/JP2021/015719

§ 371 (c)(1),
(2) Date: Oct. 12, 2023

(87) PCT Pub. No.: WO2022/219807

PCT Pub. Date: Oct. 20, 2022

(65) Prior Publication Data

US 2024/0217455 A1 Jul. 4, 2024

(51) Int. Cl.
*B60R 13/08* (2006.01)

(52) U.S. Cl.
CPC .................................... *B60R 13/08* (2013.01)

(58) Field of Classification Search
CPC ........... B32B 3/12; B32B 3/266; B32B 27/08; B32B 27/281; B32B 27/285; B32B 27/288; B32B 27/38; B32B 2307/102; F02K 1/827; F05D 2260/96
See application file for complete search history.

(56) References Cited

U.S. PATENT DOCUMENTS

| | | | | |
|---|---|---|---|---|
| 4,798,756 | A * | 1/1989 | Fukushima | B32B 5/18 428/317.1 |
| 9,783,316 | B2 * | 10/2017 | Alonso-Miralles | B64D 33/06 |
| 11,668,236 | B2 * | 6/2023 | Wood | B32B 3/12 181/292 |
| 11,911,873 | B2 * | 2/2024 | Simpson | B32B 5/024 |
| 12,385,589 | B2 * | 8/2025 | Cook | B32B 5/26 |
| 12,406,648 | B2 * | 9/2025 | Oleske | G10K 11/168 |
| 2011/0266088 | A1 * | 11/2011 | Koike | B32B 7/12 181/290 |
| 2016/0039363 | A1 * | 2/2016 | Turker | B32B 27/065 264/46.4 |
| 2021/0207367 | A1 * | 7/2021 | Clausi | B32B 27/308 |
| 2022/0388436 | A1 * | 12/2022 | Berger | B32B 27/20 |

FOREIGN PATENT DOCUMENTS

WO 2020/213685 A1 10/2020

* cited by examiner

*Primary Examiner* — Forrest M Phillips
(74) *Attorney, Agent, or Firm* — FITCH, EVEN, TABIN & FLANNERY, LLP

(57) ABSTRACT

Provided is a sound absorbing material, including: a protective layer; a first substrate layer having a communication hole; and a second substrate layer having a communication hole, in this order, in which a flexibility-toughness value of the protective layer, which is represented by Formula (I) described below, is 1 to 75 [MPa/μm].

$$\text{Flexibility-Toughness Value} = (\text{Tensile Modulus [MPa] of Protective Layer at 25°C} \times \text{Shore A Hardness of Protective Layer})/\text{Protective Layer Thickness } [\mu m] \quad \text{(I)}$$

16 Claims, 2 Drawing Sheets

SOUND ABSORBING MATERIAL, AND VEHICLE MEMBER

CROSS-REFERENCE TO RELATED APPLICATIONS

This application is a U.S. national phase application filed under 35 U.S.C. § 371 of International Application No. PCT/JP2021/015719, filed Apr. 16, 2021, designating the United States, which is incorporated herein by reference in its entirety.

TECHNICAL FIELD

The present invention relates to a sound absorbing material and a vehicle member.

BACKGROUND ART

As a sound absorbing material excellent in sound absorbing properties in a low-frequency region, a sound absorbing material formed by stacking two layers of non-woven fabric or the like is known (for example, Patent Literature 1).

CITATION LIST

Patent Literature

Patent Literature 1: International Publication WO 2020/213685

SUMMARY OF INVENTION

Technical Problem

In the case of the sound absorbing material formed from the non-woven fabric, in particular, there is room for improvement in terms of durability against a mechanical shock from the outside.

The present invention has been made in consideration of the circumstance described above, and an object thereof is to provide a sound absorbing material excellent in sound absorbing properties in a low-frequency region and durability. In addition, another object of the present invention is to provide a vehicle member including the sound absorbing material described above.

Solution to Problem

One aspect of the present invention relates to a sound absorbing material, including: a protective layer; a first substrate layer having a communication hole; and a second substrate layer having a communication hole, in this order, in which a flexibility-toughness value of the protective layer, which is represented by Formula (I) described below, is 1 to 75 [MPa/μm].

$$\text{Flexibility-Toughness Value} = (\text{Tensile Modulus [MPa] of Protective Layer at } 25^{\circ}\text{C} \times \text{Shore A Hardness of Protective Layer})/\text{Protective Layer Thickness } [\mu m] \quad (I)$$

In one aspect, the protective layer may be a layer containing an elastomer.

In one aspect, the protective layer may be a non-woven fabric.

In one aspect, the sound absorbing material may further include a resin layer between the protective layer and the first substrate layer.

In one aspect, the resin layer may contain polyolefin, polyester, or polyamide.

In one aspect, the sound absorbing material may further include a metal deposition layer on at least any one surface of the resin layer.

In one aspect, the first substrate layer and the second substrate layer may be a resin foam or a non-woven fabric.

In one aspect, a thickness of the first substrate layer may be less than a thickness of the second substrate layer.

In one aspect, a thickness of the sound absorbing material may be 1 to 100 mm.

One aspect of the present invention relates to a vehicle member including the sound absorbing material described above.

Advantageous Effects of Invention

According to the present invention, it is possible to provide the sound absorbing material excellent in the sound absorbing properties in the low-frequency region and the durability. In addition, according to the present invention, it is possible to provide the vehicle member including the sound absorbing material described above.

DESCRIPTION OF EMBODIMENTS

Hereinafter, in some cases, an embodiment of the present invention will be described in detail, with reference to the drawings. Note that, in this specification, a numerical range represented by using "to" indicates a range including numerical values described before and after "to" as the minimum value and the maximum value, respectively. In addition, in the numerical range described in this specification, the upper limit value or the lower limit value of the numerical range may be replaced with values described in Examples.

<Sound Absorbing Material>

Figure 1:
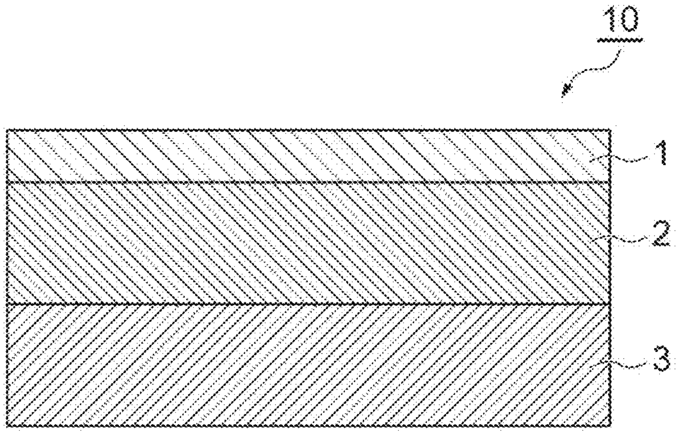
FIG. 1 is a schematic sectional view of a sound absorbing material according to one embodiment.

FIG. 1 is a schematic sectional view of a sound absorbing material according to one embodiment. A sound absorbing material 10 includes a protective layer 1, and a first substrate layer 2 having a communication hole and a second substrate layer 3 having a communication hole, as a substrate layer, in this order. A sound (sound energy) incident from the protective layer side is dissipated as heat energy when passing through the sound absorbing material. Accordingly, the attenuation of the sound is observed.

Figure 2:
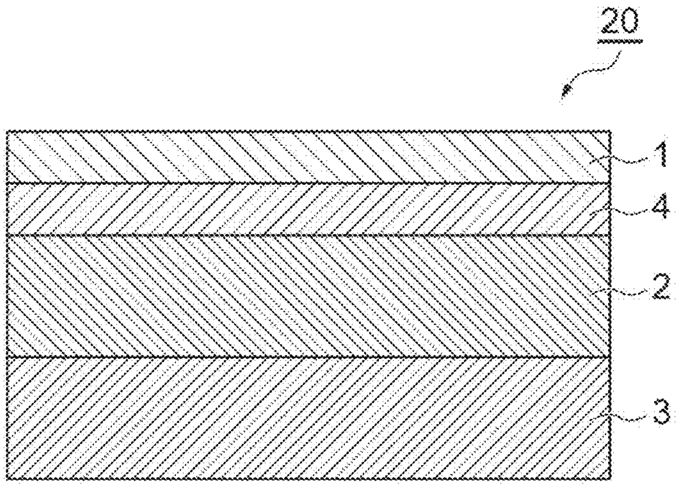
FIG. 2 is a schematic sectional view of a sound absorbing material according to one embodiment.

FIG. 2 is a schematic sectional view of a sound absorbing material according to one embodiment. A sound absorbing material 20 includes a protective layer 1, a resin layer 4, and a first substrate layer 2 having a communication hole and a second substrate layer 3 having a communication hole, as a substrate layer, in this order.

(Substrate Layer)

Examples of the substrate layer having a communication hole include a resin foam, a non-woven fabric, a polymeric porous body, and a porous ceramic. Among them, the substrate layer may be the resin foam or the non-woven fabric, from the viewpoint of being excellent in sound absorbing properties in a low-frequency region. The first substrate layer and the second substrate layer may contain the same material, or may contain different materials.

Examples of the material of the resin foam include a polyethylene resin, a polypropylene resin, a polyurethane resin, a polyester resin, an acrylic resin, a polystyrene resin, a melamine resin, a silicone resin, natural rubber, and synthetic rubber. The material of the resin foam may be the melamine resin, from the viewpoint of heat resistance, flame resistance, and the like.

Examples of the fiber configuring the non-woven fabric include an organic fiber and an inorganic fiber. Examples of the organic fiber include a polyolefin fiber such as (low-density or high-density) polyethylene, polypropylene (PP), copolymerized polyethylene, and copolymerized polypropylene, a polyester fiber such as polyethylene terephthalate (PET), polytrimethylene terephthalate, polybutylene terephthalate, polyethylene naphthalate, and polybutylene naphthalate, a polyamide fiber, an acrylic fiber, a nylon fiber, a rayon fiber, and a natural fiber such as wool. In addition, examples of the inorganic fiber include a glass fiber, a metal fiber, a ceramic fiber, and a carbon fiber. The fiber configuring the non-woven fabric may include one type or two or more types of the fibers.

The thickness of the substrate layer can be 0.1 to 50 mm, and may be 0.5 to 20 mm, or may be 2.0 to 10 mm, from the viewpoint of being excellent in the sound absorbing properties in the low-frequency region. The first substrate layer and the second substrate layer may have the same thickness, or may have different thicknesses. The thickness of the first substrate layer (the substrate layer on the sound incidence side) may be less than the thickness of the second substrate layer, from the viewpoint of being excellent in the sound absorbing properties in the low-frequency region.

The areal weight of the substrate layer can be 50 to 2000 $g/m^2$, and may be 100 to 1000 $g/m^2$, from the viewpoint of being excellent in the sound absorbing properties in the low-frequency region.

The sound absorbing material may further include another substrate layer having a communication hole, from the viewpoint of being excellent in the sound absorbing properties in the low-frequency region. That is, the sound absorbing material may further include a third substrate layer having a communication hole, a fourth substrate layer having a communication hole, and the like, in addition to the first substrate layer having a communication hole and the second substrate layer having a communication hole. Each of the substrate layers may contain the same material, or may contain different materials.

(Protective Layer)

A flexibility-toughness value of the protective layer, which is represented by Formula (I) described below, is 1 to 75 MPa/μm. The flexibility-toughness value may be 2 to 70 MPa/μm, or may be 5 to 65 MPa/μm, from the viewpoint of making the sound absorbing properties and the durability compatible at a higher level.

$$\text{Flexibility-Toughness Value} = (\text{Tensile Modulus [MPa] of Protective Layer at } 25^\circ\text{C} \times \text{Shore A Hardness of Protective Layer})/\text{Protective Layer Thickness } [\mu\text{m}] \quad \text{(I)}$$

The flexibility-toughness value is a property value set by focusing on the degree of shock absorbance per unit thickness and the degree of shock endurance of the protective layer. The degree of shock absorbance per unit thickness can be evaluated on the basis of the shore A hardness, the degree of shock endurance can be evaluated on the basis of the tensile modulus, and the fact that the product of both of the degrees is in a predetermined range indicates that the protective layer has suitable flexibility-toughness.

The tensile modulus is measured by a tensile tester. Specifically, a sample of 20 mm×50 mm is prepared, and the maximum value of an elastic modulus at 25° C. when the sample is pulled at a tensile rate of 100 mm/min by using the tensile tester is set to the tensile modulus. There is no particular limitation insofar as the formula described above is satisfied, and the tensile modulus can be 1 to 2000 MPa, and may be 10 to 1000 MPa, from the viewpoint of the durability.

The shore A hardness is measured by a durometer (type A). Specifically, a sample of 20 mm×50 mm is prepared, and the sample is stacked to have a thickness of 1 mm or more, and is left to stand in the environment of 25° C. for 1 hour. A value within 1 second (or a value represented immediately after measurement) when the hardness of the sample after still standing is measured with the durometer is set to the shore A hardness. There is no particular limitation insofar as the formula described above is satisfied, and the shore A hardness can be 20 to 95, and may be 30 to 92, from the viewpoint of the durability.

The protective layer thickness is measured by a thickness gauge. There is no particular limitation insofar as the formula described above is satisfied, and the protective layer thickness can be 10 to 2000 μm, and may be 50 to 500 μm, from the viewpoint of the durability.

In order to set the flexibility-toughness value to be in the predetermined range, for example, it is considered to adjust each of the properties, from the following viewpoint.

Examples of a method for adjusting the elastic modulus and the shore A hardness include adjusting the density of the protective layer, imparting a rigid component into the material, and increasing the ratio of an inorganic component in the material, such as a metal, a ceramic, and silica. The elastic modulus and the shore A hardness can also be adjusted by adjusting a void volume in the protective layer. The elastic modulus and the shore A hardness can also be adjusted in accordance with a skeleton component configuring the protective layer having a void, the thickness of the skeleton, a method for binding the skeleton, and the like.

Either the elastic modulus or the shore A hardness, for example, can be adjusted by suitably combining the methods described above. For example, by increasing the thickness of the skeleton configuring the protective layer while providing the void in the protective layer, it is possible to decrease the shore A hardness while maintaining the elastic modulus.

The protective layer may be a layer containing an elastomer, from the viewpoint of making the sound absorbing properties and the durability compatible at a higher level. Examples of the elastomer capable of satisfying the flexibility-toughness value include a thermoplastic elastomer and a thermosetting elastomer. Examples of the thermoplastic elastomer include resins such as a polyolefin-based resin, a polystyrene-based resin, a polyurethane-based resin, a polyester-based resin, a polyether-based resin, a polyacrylic resin, a polyamide-based resin, vinyl chloride, a chlorinated polyethylene-based resin, a polydiene-based resin, a fluorine-based resin, a silicone-based resin, and a polycarbonate-based resin, or modified resins thereof. In addition, examples of the thermosetting elastomer include resins such as a fluorine-based resin, a silicone-based resin, a urethane-based resin, and an epoxy-based resin, synthetic rubber such as isoprene rubber, ethylene propylene rubber, ethylene propylene diene rubber, and nitrile rubber (NBR), or natural rubber, or modified resins thereof. The polyurethane-based resin or the polyester-based resin is preferable from the viewpoint of a decrease in the thickness for a decrease in the weight, the heat resistance, the durability, and the like.

The layer containing the elastomer may contain other components in addition to the elastomer. Examples of the other components include inorganic particles such as silica, alumina, and talc, metal particles, and organic resin particles, from the viewpoint of improving the heat resistance, the durability, sound absorbency, vibration-damping properties, sound insulating properties, and the like, and include hollow particles, from the viewpoint of decreasing the weight. The layer containing the elastomer may contain a foaming material, an air-bubble portion by foam molding, and the like, from the viewpoint of decreasing the weight.

The protective layer may be a non-woven fabric, from the viewpoint of making the sound absorbing properties and the durability compatible at a higher level. Examples of the non-woven fabric capable of satisfying the flexibility-toughness value include a non-woven fabric obtained by rigidly binding fibers, from the viewpoint of the durability, and for example, include a non-woven fabric (such as a PET non-woven fabric) produced by a chemical bonding method, a thermal bonding method, a needle-punching method, and the like.

The surface weight (the weight per unit area) of the protective layer can be 10 to 1000 g/m$^2$, and may be 50 to 800 g/m$^2$, from the viewpoint of making the sound absorbing properties and the durability compatible at a higher level.

The density of the protective layer can be 0.1 to 10.0 g/cm$^3$, and may be 0.2 to 2.0 g/cm$^3$, from the viewpoint of making the sound absorbing properties and the durability compatible at a higher level.

In a case where the protective layer is the non-woven fabric, the average fiber diameter of the fiber configuring the non-woven fabric can be 0.1 to 100 μm, and may be 1 to 50 μm, from the viewpoint of making the sound absorbing properties and the durability compatible at a higher level.

The average fiber diameter is obtained by averaging fiber diameters of each of the fibers measured from a picture captured at 1000 magnifications with an electron microscope. Specifically, the average fiber diameter is obtained by measuring fiber diameters of a total of 100 fibers arbitrarily selected from 10 pictures to a diameter of 0.1 μm order, averaging the fiber diameters, and rounding off the second place after the decimal point.

(Resin Layer)

The sound absorbing material may further include the resin layer between the protective layer and the substrate layer, from the viewpoint of improving the sound absorbing properties, improving the durability, imparting functionality, and the like. Examples of the resin configuring the resin layer include a polyolefin-based resin such as (low-density or high-density) polyethylene, (stretched or unstretched) polypropylene, copolymerized polyethylene, and copolymerized polypropylene, a polyester-based resin such as polyethylene terephthalate, polytrimethylene terephthalate, polybutylene terephthalate, polyethylene naphthalate, and polybutylene naphthalate, a fluorine-based resin such as PTFE, FEP, and PFA, a polyimide-based resin, a polyamide-based resin, an aramid-based resin, a vinyl chloride-based resin, an acrylic resin, a polycarbonate-based resin, a polyphenylene sulfide-based resin, a polyvinyl alcohol-based resin, a polystyrene-based resin, a polyacrylonitrile-based resin, and an ethylene/vinyl acetate-based resin. The resin layer is a layer (a film) not having a communication hole.

The thickness of the resin layer can be 0.5 to 500 μm, and may be 5 to 250 μm, or may be 10 to 100 μm, from the viewpoint of being excellent in the sound absorbing properties in the low-frequency region.

The resin layer may include a metal deposition layer on the surface, from the viewpoint of imparting a function of improving a sound absorbing effect by adjusting film properties and a function of reflecting heat. That is, the sound absorbing material may further include the metal deposition layer on the surface of the resin layer. The metal deposition layer can be formed by physical deposition such as vacuum deposition or chemical deposition of a metal such as aluminum, copper, zinc, a zinc alloy, and silver. The metal deposition layer may be provided on both surfaces of the resin layer, or may be provided on one surface.

The resin layer may be a perforated film, from the viewpoint of improving the sound absorbing effect of the low-frequency region and adjusting a sound absorbing frequency peak. The perforated film may have holes arranged into the shape of a lattice or a rhombus. The hole may be in the shape of a circle having a diameter of 0.1 to 50.0 mm, may be in the shape of a circle having a diameter of 0.2 to 10.0 mm, or may be in the shape of a circle having a diameter of 0.3 to 5.0 mm, from the viewpoint of being excellent in the sound absorbing properties in the low-frequency region. The shape of the hole may be circular, elliptical, rectangular, polygonal, or the like.

(Bonding Adhesive Layer)

The sound absorbing material may further include a bonding adhesive layer between the respective layers described above. The sound absorbing material may include the bonding adhesive layer at least between the protective layer and the first substrate layer, and between the first substrate layer and the second substrate layer. In addition, the sound absorbing material may include the bonding adhesive layer at least between the protective layer and the resin layer, between the resin layer and the first substrate layer, and between the first substrate layer and the second substrate layer.

Examples of the bonding adhesive layer include a layer containing a bonding adhesive component such as a vinyl acetate resin, a polyolefin resin, an ethylene/vinyl acetate copolymer resin, an isobutene/maleic anhydride copolymer resin, an acrylic copolymer resin, an acrylic monomer, an acrylic oligomer, styrene/butadiene rubber, a vinyl chloride resin, chloroprene rubber, nitrile rubber, a urethane resin, a silylated urethane resin, an epoxy resin, a modified epoxy resin, a polyethylene resin, an ionomer resin, a silicone resin, a modified silicone resin, water glass, and silicate; and a laminated product (for example, a double-faced tape) having a layer containing the bonding adhesive component on both surfaces of a support composed of a paper, a fabric, a resin film, a metal tape, or the like. Each of the bonding adhesive layers may contain the same material, or may contain different materials.

The thickness of the bonding adhesive layer is not particularly limited, but can be 0.01 to 500 μm, and may be 1 to 250 μm. Each of the bonding adhesive layers may have the same thickness, or may have different thicknesses.

The weight of the bonding adhesive layer is not particularly limited, but can be 1 to 500 g/m$^2$, and may be 5 to 200 g/m$^2$, or may be 10 to 150 g/m$^2$. Each of the bonding adhesive layers may have the same weight, or may have different weights.

The thickness of the sound absorbing material can be 1 to 100 mm, and may be 2 to 50 mm, or may be 5 to 30 mm, from the viewpoint of the exhibition of the sound absorbing properties, material workability, space-saving, and the like.

The average normal incidence sound absorption coefficient of the sound absorbing material at 500 to 1000 Hz, which is measured on the basis of JIS A 1405-1, can be 0.45 or more, and may be 0.5 or more, from the viewpoint of excellent sound absorbing properties in the low-frequency region. From the same viewpoint, the maximum normal incidence sound absorption coefficient of the sound absorbing material at 500 to 1000 Hz can be 0.65 or more, and may be 0.7 or more.

<Method for Producing Sound Absorbing Material>

The sound absorbing material can be produced by laminating each of the layers. The sound absorbing material may be used in a state where the layers adhere to each other by including the bonding adhesive layer as described above, or may be used in a state where the layers do not adhere to each other. In addition, the bonding adhesive layer may be provided only between some layers. The laminate configuring the sound absorbing material may be used in the state of being contained in a housing.

<Application of Sound Absorbing Material>

The sound absorbing material described above is excellent not only in the sound absorbing properties in the low-frequency region, but also in the durability. Accordingly, the sound absorbing material can be preferably used in the applications of an automobile, a rail vehicle, an aircraft, a vessel, a building such as a house, and the like. Here, the low-frequency region can be a region in which a frequency is 1000 Hz or less, and the sound absorbing material has excellent sound absorbing properties in a frequency region of 250 to 1000 Hz, in particular, 500 to 1000 Hz.

<Vehicle Member>

A vehicle member includes the sound absorbing material described above. Examples of the vehicle member include the following aspects. The vehicle member may be an automobile member.

Exterior: a vehicle member and an exterior material for a vehicle, which are a sound absorbing member of an exterior material for a vehicle.

Examples of the exterior include an undercover or an under protector, and a soundproof cover (for a vehicle), and specifically include an engine undercover, a floor undercover, a rear undercover, a transmission cover, a fender liner/protector, and a mud guard.

Interior: a vehicle member and an interior material for a vehicle, which are a sound absorbing member of an interior material for a vehicle.

Examples of the interior include a silencer for a vehicle and a soundproofing for a vehicle, and specifically include a ceiling material (a roof silencer), a dashboard silencer, a floor silencer, a floor carpet, and a hood silencer.

Others: a sound absorbing material for a tire.

Examples of the sound absorbing material for a tire include a sound absorbing structure obtained by combining a cover for a vehicle, a case, and the like with the sound absorbing materials described above.

The contents of this embodiment will be listed below.

A sound absorbing material, including: a protective layer; a first substrate layer having a communication hole; and a second substrate layer having a communication hole, in this order, in which a flexibility-toughness value of the protective layer, which is represented by Formula (I) described below, is 1 to 75 [MPa/μm].

$$\text{Flexibility–Toughness Value} = (\text{Tensile Modulus [MPa] of Protective Layer at 25° C} \times \text{Shore A Hardness of Protective Layer})/\text{Protective Layer Thickness } [\mu\text{m}] \tag{I}$$

The sound absorbing material described above, in which the protective layer is a layer containing an elastomer.

The sound absorbing material described above, in which the protective layer is a non-woven fabric.

The sound absorbing material described above, further including a resin layer between the protective layer and the first substrate layer.

The sound absorbing material described above, in which the resin layer contains polyolefin, polyester, or polyamide.

The sound absorbing material described above, further including a metal deposition layer on at least any one surface of the resin layer.

The sound absorbing material described above, in which the first substrate layer and the second substrate layer are a resin foam or a non-woven fabric.

The sound absorbing material described above, in which a thickness of the first substrate layer is less than a thickness of the second substrate layer.

The sound absorbing material described above, in which a thickness is 1 to 100 mm.

A vehicle member, including the sound absorbing material described above.

EXAMPLES

Hereinafter, the present invention will be described in more detail by Examples, but the present invention is not limited to such Examples.

(Preparation of Substrate Layer)

Substrate 1: a PET non-woven fabric (an areal weight of 200 g/m$^2$, a thickness of 3 mm)

Substrate 2: a PET non-woven fabric (an areal weight of 250 g/m$^2$, a thickness of 7 mm)

(Preparation of Protective Layer)

Protective layers shown in Table 1, Table 2, and Table 3 were prepared.

Thickness: The protective layer was cut into 200 mm×200 mm piece and its thickness was measured using a thickness gauge (a digital thickness gauge JAN-257 with a gauge head of ϕ20 mm, manufactured by OZAKI MFG. CO., LTD.). The average value of a total of 5 measurement spots including the center and four corners was set to the thickness of the protective layer.

Tensile modulus: The tensile modulus was measured by a tensile tester (EZ-Test, manufactured by SHIMADZU CORPORATION). A sample of 20 mm×50 mm was prepared, and the maximum elastic modulus at 25° C. when the sample was pulled at a tensile rate of 100 mm/min by using the tensile tester was set to the tensile modulus. In a case where there are a TD direction and an MD direction, the lower elastic modulus was adopted. The measurement was performed 3 times, and the average value thereof was set to the tensile modulus of the protective layer.

Shore A hardness: The shore A hardness was measured by a durometer (type A). A sample of 20 mm×50 mm was prepared, and the sample was stacked to have a thickness of 1 mm or more, and the hardness of the stacked sample measured with the durometer was set to the shore A hardness. The average value of a total of 5 measurement spots including the center and four corners was set to the shore A hardness of the protective layer.

TABLE 1

| | | Example | | |
|---|---|---|---|---|
| | | E1 | E2 | E3 |
| Type | — | Polyurethane elastomer | Polyurethane elastomer | Polyurethane elastomer |
| Average fiber diameter | μmφ | — | — | — |
| Thickness | μm | 50.1 | 99.8 | 501.2 |
| Areal weight | g/m$^2$ | 60.0 | 116.1 | 611.9 |
| Density | g/cm$^3$ | 1.20 | 1.16 | 1.22 |
| Tensile modulus | MPa | 32.2 | 30.5 | 35.8 |
| Shore A hardness | — | 85 | 85 | 92 |
| Flexibility-toughness value | MPa/μm | 54.7 | 25.9 | 6.6 |

TABLE 2

| | | Example | | | | |
|---|---|---|---|---|---|---|
| | | E4 | E5 | E6 | E7 | E8 |
| Type | — | PET non-woven fabric | PET non-woven fabric | PET non-woven fabric | PET non-woven fabric | PET non-woven fabric |
| Average fiber diameter | μmφ | 30.1 | 6.3 | 6.3 | 15.2 | 22.5 |
| Thickness | μm | 398.6 | 402.1 | 450.1 | 595.2 | 430.5 |
| Areal weight | g/m$^2$ | 210.4 | 100.6 | 300.0 | 202.1 | 100.1 |
| Density | g/cm$^3$ | 0.53 | 0.25 | 0.67 | 0.34 | 0.23 |
| Tensile modulus | MPa | 280.4 | 96.9 | 340.1 | 280.4 | 124.5 |
| Shore A hardness | — | 88 | 74 | 94 | 85 | 78 |
| Flexibility-toughness value | MPa/μm | 61.7 | 17.9 | 71.0 | 40.5 | 22.6 |

TABLE 3

| | | Comparative Example | | | | |
|---|---|---|---|---|---|---|
| | | CE1 | CE2 | CE3 | CE4 | CE5 |
| Type | — | PET film | PET film | PET film | PP film | PET non-woven fabric |
| Average fiber diameter | μmφ | — | — | — | — | 6.3 |
| Thickness | μm | 50.2 | 250.0 | 499.1 | 500.2 | 199.5 |
| Areal weight | g/m$^2$ | 69.1 | 350.3 | 701.0 | 451.9 | 100.0 |
| Density | g/cm$^3$ | 1.38 | 1.40 | 1.40 | 0.90 | 0.50 |
| Tensile modulus | MPa | 2155.7 | 852.7 | 448.6 | 399.6 | 422 |
| Shore A hardness | — | 98 | 99 | 99 | 98 | 86 |
| Flexibility-toughness value | MPa/μm | 4268.3 | 337.7 | 88.8 | 78.3 | 181.5 |

| | | Comparative Example | | | | |
|---|---|---|---|---|---|---|
| | | CE6 | CE7 | CE8 | CE9 | CE10 |
| Type | — | PET non-woven fabric | Polyester elastomer | Polyurethane elastomer | Aluminum foil | Aluminum foil |
| Average fiber diameter | μmφ | 20.5 | — | — | — | — |
| Thickness | μm | 400.0 | 59.7 | 31.1 | 500.2 | 250.4 |
| Areal weight | g/m$^2$ | 39.8 | 74.2 | 36.5 | 1355.1 | 680.9 |
| Density | g/cm$^3$ | 0.10 | 1.23 | 1.20 | 2.71 | 2.72 |
| Tensile modulus | MPa | 4.13 | 83.1 | 28.4 | 598.6 | 1272.3 |
| Shore A hardness | — | 75 | 94 | 85 | 98 | 98 |
| Flexibility-toughness value | MPa/μm | 0.8 | 130.2 | 80.5 | 117.3 | 498.7 |

(Preparation of Resin Layer)

The following resin layer was prepared.

Double-faced aluminum deposition polyethylene terephthalate film (AlPET): a thickness of 12 μm (Preparation of Bonding Adhesive Layer)

The following bonding adhesive layer was prepared.

Double-faced tape: Hi-Bon 11-652, manufactured by Showa Denko Materials Co., Ltd., a thickness of 0.12 mm (Preparation of Sound Absorbing Material)

Sound absorbing materials having configurations shown in Table 4 and Table 5 were prepared. The double-faced tape was used in the bonding adhesion of each of the layers.

(Evaluation of Sound Absorbing Properties of Sound Absorbing Material)

The normal incidence sound absorption coefficient of each of the prepared sound absorbing materials was measured as follows. A sound was incident from the protective layer side. The average value of the normal incidence sound absorption coefficients at 500 to 1000 Hz was calculated as the average sound absorption coefficient, and the maximum value of the normal incidence sound absorption coefficients was set to the maximum sound absorption coefficient. In a case where the average sound absorption coefficient was 0.45 or more, and the maximum sound absorption coefficient was 0.65 or more, it was determined that the sound absorbing material was excellent in sound absorbing properties in a low-frequency region (500 to 1000 Hz). Results are shown in Table 4 and Table 5.

Device name: a 4206 type impedance tube (manufactured by Brüel & Kjær Sound & Vibration Measurement A/S)

Measurement method: a normal incidence sound absorption coefficient (based on JIS A 1405-1)

Measurement range: 50 to 1600 Hz (Evaluation of Durability of Sound Absorbing Material)

The durability (the chipping resistance) of each of the prepared sound absorbing materials was evaluated. In the evaluation, Gravel Test Instrument JA400 (manufactured by Suga Test Instruments Co., Ltd.) was used, and 850 g of No. 7 crushed stone was applied to the protective layer at a pressure of 0.4 MPa. After that, the state of the surface of the protective layer was visually checked, and the durability was evaluated on the basis of the following criteria. In the case of the evaluation of A or B, it was determined that the sound absorbing material was excellent in the durability. Results are shown in Table 4 and Table 5.

A: There is no perforation and no dent.

B: There is no perforation but a dent.

C: There is a perforation (less than 5 spots).

D: There is a perforation (5 spots or more).

TABLE 4

| Protective layer | | Example E1 | E2 | E3 | E4 | E5 | E6 | E7 | E8 |
|---|---|---|---|---|---|---|---|---|---|
| Resin layer | | — | — | — | Present | Present | Present | Present | Present |
| Substrate layer 1 | | Substrate 1 | Substrate 1 | Substrate 1 | Substrate 1 | Substrate 1 | Substrate 1 | Substrate 1 | Substrate 1 |
| Substrate layer 2 | | Substrate 2 | Substrate 2 | Substrate 2 | Substrate 2 | Substrate 2 | Substrate 2 | Substrate 2 | Substrate 2 |
| Normal incidence sound absorption coefficient | Average | 0.45 | 0.48 | 0.50 | 0.49 | 0.48 | 0.49 | 0.50 | 0.49 |
| | Maximum | 0.66 | 0.72 | 0.65 | 0.71 | 0.69 | 0.65 | 0.68 | 0.66 |
| Durability | — | B | A | A | A | B | A | A | A |

TABLE 5

| Protective layer | | Comparative Example CE1 | CE2 | CE3 | CE4 | CE5 |
|---|---|---|---|---|---|---|
| Resin layer | | — | — | — | — | Present |
| Substrate layer 1 | | Substrate 1 | Substrate 1 | Substrate 1 | Substrate 1 | Substrate 1 |
| Substrate layer 2 | | Substrate 2 | Substrate 2 | Substrate 2 | Substrate 2 | Substrate 2 |
| Normal incidence sound absorption coefficient | Average | 0.41 | 0.46 | 0.47 | 0.49 | 0.46 |
| | Maximum | 0.75 | 0.70 | 0.59 | 0.69 | 0.76 |
| Durability | — | D | D | C | C | D |

| Protective layer | | Comparative Example CE6 | CE7 | CE8 | CE9 | CE10 |
|---|---|---|---|---|---|---|
| Resin layer | | Present | — | — | — | — |
| Substrate layer 1 | | Substrate 1 | Substrate 1 | Substrate 1 | Substrate 1 | Substrate 1 |
| Substrate layer 2 | | Substrate 2 | Substrate 2 | Substrate 2 | Substrate 2 | Substrate 2 |
| Normal incidence sound absorption coefficient | Average | 0.45 | 0.40 | 0.42 | 0.46 | 0.47 |
| | Maximum | 0.62 | 0.70 | 0.53 | 0.54 | 0.51 |
| Durability | — | C | C | D | B | B |

REFERENCE SIGNS LIST

1: protective layer, 2: first substrate layer having communication hole, 3: second substrate layer having communication hole, 4: resin layer, 10, 20: sound absorbing material.

The invention claimed is:

1. A sound absorbing material, comprising:

a protective layer;

a first substrate layer having a communication hole; and a second substrate layer having a communication hole, in this order, wherein a flexibility-toughness value of the protective layer, which is represented by Formula (I) described below, is 1 to 75 [MPa/μm]:

$$\text{Flexibility-Toughness Value} = (\text{Tensile Modulus [MPa] of Protective Layer at } 25^\circ\text{C} \times \text{Shore A Hardness of Protective Layer})/\text{Protective Layer Thickness } [\mu\text{m}]. \quad (I)$$

2. The sound absorbing material according to claim 1, wherein the protective layer is a layer containing an elastomer.

3. The sound absorbing material according to claim 1, wherein the protective layer is a non-woven fabric.

4. The sound absorbing material according to claim 1, further comprising a resin layer between the protective layer and the first substrate layer.

5. The sound absorbing material according to claim 4, wherein the resin layer contains polyolefin, polyester, or polyamide.

6. The sound absorbing material according to claim 4, further comprising a metal deposition layer on at least any one surface of the resin layer.

7. The sound absorbing material according to claim 1, wherein the first substrate layer and the second substrate layer are a resin foam or a non-woven fabric.

8. The sound absorbing material according to claim 1, wherein a thickness of the first substrate layer is less than a thickness of the second substrate layer.

9. The sound absorbing material according to claim 1, wherein a thickness is 1 to 100 mm.

10. A vehicle member, comprising the sound absorbing material according to claim 1.

11. The sound absorbing material according to claim 1, wherein the first substrate layer comprises a non-woven fabric.

12. The sound absorbing material according to claim 11, wherein the non-woven fabric of the first substrate layer comprises organic fibers.

13. The sound absorbing material according to claim 1, wherein the second substrate layer comprises a non-woven fabric.

14. The sound absorbing material according to claim 13, wherein the non-woven fabric of the second substrate layer comprises organic fibers.

15. The sound absorbing material according to claim 1, wherein each of the first substrate layer and the second substrate layer comprises a non-woven fabric.

16. The sound absorbing material according to claim 15, wherein the non-woven fabrics of the first and second substrate layers comprise organic fibers.

* * * * *